(12) United States Patent
King et al.

(10) Patent No.: US 10,067,011 B2
(45) Date of Patent: Sep. 4, 2018

(54) PRESSURE INDICATOR FILMS FOR HIGH TEMPERATURE APPLICATIONS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

(*) Notice: Subject to any disclaimer, the term of this patent is extended or adjusted under 35 U.S.C. 154(b) by 276 days.

(21) Appl. No.: 15/050,990

(22) Filed: Feb. 23, 2016

(65) Prior Publication Data

US 2017/0241849 A1 Aug. 24, 2017

(51) Int. Cl.
*G01L 1/24* (2006.01)
*C09D 179/08* (2006.01)
*B32B 27/28* (2006.01)
*C08L 79/08* (2006.01)

(52) U.S. Cl.
CPC ............ *G01L 1/24* (2013.01); *B32B 27/281* (2013.01); *C08L 79/08* (2013.01); *C09D 179/08* (2013.01); *G01L 1/247* (2013.01); *Y10T 428/249996* (2015.04)

(58) Field of Classification Search
CPC .......... G01L 1/24; G01L 1/247; G01L 1/246; C09D 179/08; C08L 79/08; Y10T 428/249995; Y10T 428/249996; B32B 27/281
USPC ...................................................... 428/321.5
See application file for complete search history.

(56) References Cited

U.S. PATENT DOCUMENTS

| 4,085,949 A * | 4/1978 | Asao et al. ............... B32B 3/26 |
| | | 282/27.5 |
| 2003/0154903 A1 | 8/2003 | Rakowski |
| 2010/0242830 A1 | 9/2010 | Manahan |
| 2010/0326198 A1 | 12/2010 | Ribi |
| 2012/0312092 A1 | 12/2012 | Miller et al. |

(Continued)

FOREIGN PATENT DOCUMENTS

WO 2008112811 A2 9/2008

OTHER PUBLICATIONS

"Paper, Film & Foil Converter—Measure Pressure with Thin Film", SPI Sensor Products, Inc., http://www.sensorprod.com/news/articles/2003-05_paperfilm_, viewed Jan. 13, 2016, 2 pp.

(Continued)

*Primary Examiner* — Bruce H Hess
(74) *Attorney, Agent, or Firm* — Patterson + Sheridan, LLP (57) ABSTRACT

In an example, a pressure indicator film includes a first polymeric film material and a second polymeric film material that satisfy a threshold thermal degradation temperature. The pressure indicator film includes microcapsules on a surface of the first polymeric film material and a developer material on a surface of the second polymeric film material. The microcapsules are formed from a polymeric shell material that satisfies the threshold thermal degradation temperature. The microcapsules encapsulate a payload that includes a pH indicator and a solvent having a boiling point that is greater than the threshold thermal degradation temperature.

17 Claims, 4 Drawing Sheets

(56) References Cited

U.S. PATENT DOCUMENTS

2014/0044609 A1 2/2014 Prusik et al.
2014/0106963 A1 4/2014 Ribi
2014/0275381 A1 9/2014 Ribi

OTHER PUBLICATIONS

"Prescale Pressure Indicating Film", Tekscan, https://www.tekscan.com/product-group/test-measurement/pressure-indicating-film, viewed Jan. 14, 2016, 3 pp.
"Pressurex Sensor Film, Sensor Products, Inc. Introduces Pressurex, a Tactile Force Indicating Sensor Film", Adhesives and Sealants.com, Apr. 16, 2011, 1 pg.
FLEXcon—Product Finder, viewed Feb. 1, 2016, https://www.flexcon.com/product-finder, 4 pages.
Fujifilm Prescale—"Tactile Pressure Indicating Sensor Film", Sensor Products, Inc., viewed Feb. 2, 2016.
Keller, et al., "Mechanical Properties of Microcapsules Used in a Self-Healing Polymer", Experimental Mechanics, 2006, vol. 46, pp. 725-733.
Yuan, et al., "Microencapsulation and Characterization of Polyamic Acid Microcapsules Containing n-Octadecane via Electrospraying Method", Materials Express, American Scientific Publishers, vol. 5, No. 6, 2015, pp. 480-488.
"Surface Pressure Mapping Sensors", Sensor Products Inc., 2016, http://www.sensorprod.com/pressurex_micro.php, 5 pages.

* cited by examiner

PRESSURE INDICATOR FILMS FOR HIGH TEMPERATURE APPLICATIONS

I. FIELD OF THE DISCLOSURE

The present disclosure relates generally to pressure indicator films for high temperature applications.

II. BACKGROUND

Pressure indicator films may be useful in understanding a relative pressure between two contacting surfaces. Pressure indicator films exhibit color changes that are proportional to applied pressure, enabling visual determination and, to some extent, quantitative pressure distributions between the two contacting surfaces. If a pressure indicator film indicates that pressure is being applied with inadequate uniformity, remedial changes may be made to a manufacturing process. Conventional pressure indicator films may be designed for low temperature applications and may be unsuitable for applications that require high heat.

III. SUMMARY OF THE DISCLOSURE

According to an embodiment, a pressure indicator film includes a first polymeric film material and a second polymeric film material that satisfy a threshold thermal degradation temperature. The pressure indicator film includes microcapsules on a surface of the first polymeric film material and a developer material on a surface of the second polymeric film material. The microcapsules are formed from a polymeric shell material that satisfies the threshold thermal degradation temperature. The microcapsules encapsulate a payload that includes a pH indicator and a solvent having a boiling point that is greater than the threshold thermal degradation temperature.

According to another embodiment, a process of forming a pressure indicator film includes applying microcapsules to a surface of a first polymeric film material. The first polymeric film material satisfies a threshold thermal degradation temperature that is not less than 100° C., and the microcapsules are formed from a polymeric shell material that satisfies the threshold thermal degradation temperature. The process also includes applying a powder to a surface of a second polymeric film material that satisfies the threshold thermal degradation temperature. The process further includes joining the first polymeric film material to the second polymeric film material to form a pressure indicator film.

According to another embodiment, a process of forming a pressure indicator film includes performing an electrospraying operation to form a first set of microcapsules. The first set of microcapsules have a polyamic acid (PAA) shell material encapsulating a payload that includes a pH indicator and a solvent. The process includes forming a second set of microcapsules having a polyimide shell material by heating the first set of microcapsules to imidize the PAA shell material. The process also includes applying the second set of microcapsules to a surface of a first polyimide film. The process further includes applying a developer material to a surface of a second polyimide film, and joining the first polyimide film to the second polyimide film to form a pressure indicator film.

One advantage of the present disclosure is the ability to form pressure indicator films that are suitable for high temperature applications.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. DETAILED DESCRIPTION

The present disclosure relates to pressure indicator films (PIFs) suitable for use in high temperature applications (also referred to herein as HT-PIFs) and processes for forming HT-PIFs. PIFs may include a layer of microcapsules with an encapsulated indicating agent on a polymeric substrate that is joined to another polymeric substrate that includes a color developing agent. As used herein, the term "microcapsule" is used to refer to capsules that are in a range of about 10 microns to 1000 microns in diameter. However, it will be appreciated that the following disclosure may be applied to capsules having a smaller size (also referred to as "nanocapsules").

Conventional PIFs have usability temperatures that are generally limited to between 0° C. and 66° C. Such low usability temperatures may result from the film materials, the microcapsule shell materials, and/or the encapsulated indicating agents. As such, conventional PIFs may be limited to low temperature applications and may be unsuitable for applications that require high heat. As used herein, the term "high temperature application" refers to an operation in which application of heat results in a temperature that is at least 100° C. To illustrate, conventional PIFs may be unsuitable for evaluating a uniformity of pressure during printed circuit board (PCB) laminate manufacturing, in which temperatures may reach as high as 220° C. The HT-PIFs of the present disclosure are suitable for high temperature applications (e.g., PCB laminate manufacturing, among other possibilities) in which pressure indication is important to ensure even pressure distribution across two surfaces.

During fabrication of some PCBs, such as high-end PCBs, multiple layers (e.g., cores that include glass cloth, resin, etc.) are stacked in a lamination press. The stacked layers are pressed between two platens which are heated while pressure is applied. As an illustrative, non-limiting example, the stacked layers may be pressed together at 500-600 pounds per square inch (psi) for a time period of several hours. The temperature may be ramped over the time period from a preheat temperature (e.g., about 50° C.) to a high temperature (e.g., about 220° C.). During the PCB lamination process, if the pressure across the two platens is not substantially uniform, localized areas of a resulting PCB laminate may be unsatisfactory, potentially resulting in delamination of core layer(s).

A workaround involves creating a "sandwich" of a conventional PIF between two layers of a heat-tolerant polymeric film (e.g., a polyimide film, such as Kapton®) in order to allow for measurement of pressure distribution in high heat applications. However, the additional thickness of this sandwich construction detrimentally affects the pressure distribution map as the sandwich construction imparts additional compliance to the assembly. In the case of PCBs having regions to be filled with resin, a thick film tends to result in a cushioning effect during compression of the layers between the two platens. While pressure distribution may be satisfactory in such cases, an overall pressure may be insufficient to cause resin to flow into particular regions.

The HT-PIFs of the present disclosure are formed from materials that are suitable for high temperature applications, such as PCB laminate manufacturing. The HT-PIFs of the present disclosure include a first polymeric film material and a second polymeric film material that satisfy a threshold thermal degradation temperature (e.g., not less than 100° C.). Microcapsules are applied to a surface of the first polymeric film material. The microcapsules are formed form a polymeric shell material that satisfies the threshold thermal degradation temperature. In some cases, the microcapsules encapsulate a payload that includes a pH indicator and a solvent having a boiling point that is greater than the threshold thermal degradation temperature. In this case, a developer material is deposited on the surface of the second polymeric film material. Alternatively, the payload may include the developer material, and the pH indicator may be deposited on the surface of the second polymeric film material. In either case, application of pressure sufficient to rupture the microcapsules and release the payload results in a color change associated with a chemical reaction of the pH indicator and the developer material. The thermal stability of the materials of the HT-PIFs of the present disclosure enables the color change to be viewed after pressure is applied under high temperature conditions.

As further described herein, the microcapsules of the HT-PIFs of the present disclosure may be generated using an electrospray method. In a particular embodiment, polyamic acid (an intermediate in polymerization of polyimide, also referred to by the acronym "PAA") is used to generate a shell material around an encapsulant. In some cases, the encapsulant may include an indicator (e.g., an acid-base indicator, referred to herein as a pH indicator) and a high boiling point solvent. Alternatively, the encapsulant may include a developer and a solvent.

After formation of the microcapsules, the microcapsules may be applied (e.g., printed, dispersed, patterned, etc.) to a heat-tolerant thin film substrate and covered with an additional heat-tolerant thin film substrate containing a developing agent (or a pH indicator in the case where the developing agent is the encapsulant). The thin film substrate materials may be substantially optically transparent for viewing the pressure indicating reaction and developed pattern.

After processing of the two films, the two layers are joined to form a HT-PIF. For example, the two layers may be joined together by an adhesive around the edges of the film. Examples of adhesives include tape, double sided adhesive, cold laminating, etc. The resultant HT-PIF allows for use at high temperatures, while showing the variation in pressures by intensity of the developed indicating agent.

Figure 1:
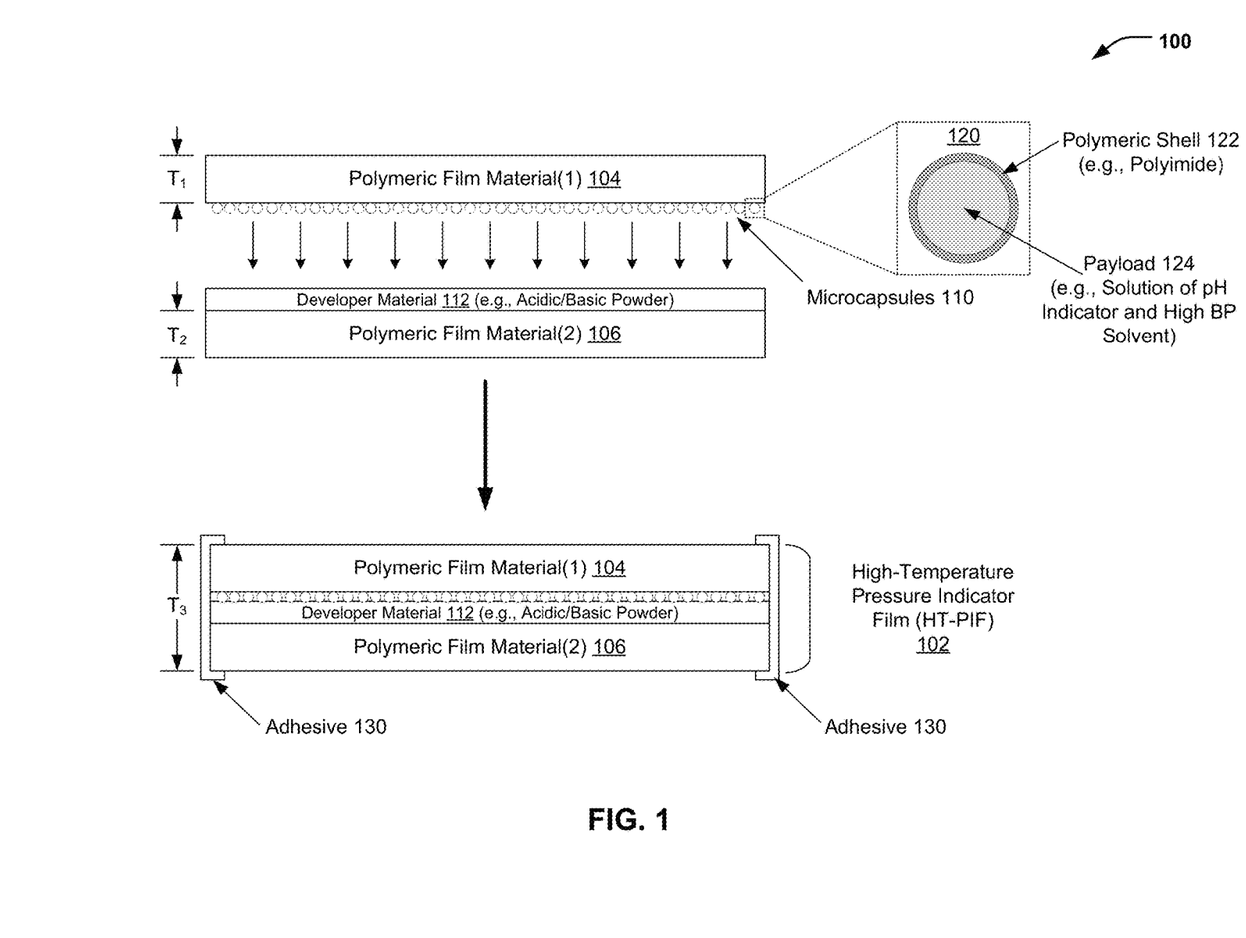
FIG. 1 is a diagram illustrating a process of forming a high-temperature pressure indicator film (HT-PIF), according to one embodiment.

Referring to FIG. 1, a diagram 100 illustrates an example of a process of forming a high-temperature PIF (HT-PIF) 102, according to a particular embodiment. The first diagram illustrated at the top of FIG. 1 is an exploded cross-sectional view that depicts a first polymeric film material 104 (designated "Polymeric Film Material(1)" in FIG. 1) and a second polymeric film material 106 (designated "Polymeric Film Material(2)" in FIG. 1), with microcapsules 110 applied to a surface of the first polymeric film material 104. In the particular embodiment illustrated in FIG. 1, a developer material 112 is applied to a surface of the second polymeric film material 106. The second diagram at the bottom of FIG. 1 illustrates that joining the two polymeric film materials 104, 106 results in the formation of the HT-PIF 102. As described further herein, the HT-PIF 102 of FIG. 1 may be suitable for use in high temperature applications (e.g., a PCB lamination process, among other alternatives).

In a particular embodiment, the first polymeric film material 104 may include a first polyimide material, and the second polymeric film material 106 may include a second polyimide material. The second polyimide material may be the same as the first polyimide material or may be different from the first polyimide material. Such polyimide materials may have a thermal degradation temperature of about 400° C. and may be suitable materials for high temperature applications. An illustrative, non-limiting example of an alternative polymeric film material is a polyether ether ketone (PEEK) material having a thermal degradation temperature of about 250° C., which may represent a satisfactory thermal degradation temperature in some high temperature applications. Other polymeric materials or combinations of materials may be selected based on a temperature range for a particular high temperature application. Illustrative, non-limiting examples include nylons and/or aliphatic polyamides that are thermally stable above 300° C., polyarylamides (polyaramids), or copolymers of paraphenylenediamine and terephthalic acid. In a particular embodiment, at least one of the first polymeric film material 104 or the second polymeric film material 106 is substantially optically transparent for viewing the pressure indicating reaction and developed pattern.

FIG. 1 illustrates a callout view 120 of one of the microcapsules 110 applied to the surface of the first polymeric film material 104. The callout view 120 illustrates that the microcapsules 110 are formed from a polymeric shell material 122, and the microcapsules 110 encapsulate a payload 124. The polymeric shell material 122 satisfies a threshold thermal degradation temperature. The threshold thermal degradation temperature may be at least 100° C. and may vary depending on a particular temperature range associated with a high temperature application. For example, the threshold thermal degradation temperature may correspond to a temperature associated with a PCB lamination operation (e.g., at least 220° C.). In a particular embodiment, the polymeric shell material 122 may include a polyimide material. As described further herein with respect to FIG. 2, an electrospraying operation may be used to form a polyamic acid (PAA) shell material encapsulating the payload 124, and heat may be applied to imidize the PAA shell material to form a polyimide shell material.

In cases where the developer material 112 is deposited on the surface of the second polymeric film material 106 (as depicted in the example of FIG. 1), the payload 124 may include a pH indicator and a solvent having a boiling point (BP) that is greater than the threshold degradation temperature (also referred to herein as a "high boiling point solvent"). While not shown in the example of FIG. 1, the payload 124 may be a solution that includes the developer material 112 (in alternative cases where the pH indicator is applied to the surface of the second polymeric film material 106).

In some cases, criteria for selection of the pH indicator may include thermal stability (e.g., a decomposition temperature and a melting temperature above 200 to 210° C.), solubility in high boiling point solvent(s), and a pH range that activates the indicator in a pH range of about 3 to 11. In a particular embodiment, the pH indicator may include phenolphthalein. Other examples of pH indicators may include bromophenol blue, congo red, methyl orange, ethyl orange, resazurin (e.g., the sodium salt), resorcin blue, alizarin red s, bromocresol purple, chlorophenol red (e.g., the sodium salt), alizarin, nitrazine yellow, brilliant yellow, phenol red, natural red, cresol red, turmeric, metacresol purple, thymol blue, p-naphtholbenzein, o-cresolthalein, thymolphthalein, or alizarin yellow r (among other alternatives).

In a particular embodiment, the developer material 112 may include a basic material, such as calcium oxide, calcium hydroxide, or a combination thereof (among other alternatives). In another embodiment, the developer material 112 may include an acidic material, such as boric acid, cyanuric acid, malonic acid, tartaric acid, or a combination thereof (among other alternatives). In some cases, the developer material 112 may be a powder that is applied to the surface of the second polymeric film material 106. In a particular embodiment, a solvent may be used and could include propylene carbonate (BP=242° C.), ethylene carbonate (BP=261° C.), 1,3-Dimethyl-2-imidazolidinone (DMI) (BP=225° C.), 1,3-Dimethyl-3,4,5,6-tetrahydro-2-pyrimidone (DMPU) (BP=246° C.), sulfolane (BP=287° C.), or ethylene glycol (BP=290° C.), among other alternatives.

FIG. 1 illustrates that, after application of the microcapsules 110 and the developer material 112, the first polymeric film material 104 and the second polymeric film material 106 may be joined to form the HT-PIF 102. For example, the two polymeric film materials 102, 104 may be joined together by an adhesive 130 (e.g., around the edges of the films). Examples of adhesives may include tape, double-sided adhesive, cold laminating, etc. that may be selected to match the temperature resistance of the HT-PIF 102.

FIG. 1 illustrates that the HT-PIF 102 has a total thickness value (designated "$T_3$" in FIG. 1) that includes a first thickness value of the first polymeric film material 104 (designated "$T_1$" in FIG. 1) and a second thickness value of the second polymeric film material 106 (designated "$T_2$" in FIG. 1). In some cases, the HT-PIF 102 may have a total thickness value ($T_3$) that is less than 6 millimeters (mm), such as in a range of 2 mm to 5.8 mm, in a range of 2.2 mm to 5.6 mm, in a range of 2.4 mm to 5.4 mm, in a range of 2.6 mm to 5.2 mm, or in a range of 3 mm to 5 mm. In a particular embodiment, the first thickness value ($T_1$) is about 1 mm, and the second thickness value ($T_2$) is about 1 mm. In some cases (e.g., a PCB lamination operation), a reduced thickness of the HT-PIF 102 may reduce/eliminate the problems associated with the aforementioned "workaround" that includes the use of a conventional PIF sandwiched between two high-temperature films having a minimum total thickness of at least 6 mm (based on two 1 mm polyimide films surrounding a 4 mm conventional PIF). Thus, in some cases, the HT-PIF 102 may have a total thickness value ($T_3$) that satisfies a threshold thickness value associated with satisfactory pressure distribution measurement of a PCB lamination operation.

Thus, FIG. 1 illustrates an example of a process of forming a HT-PIF that may be suitable for use in high temperature applications (e.g., with temperatures greater than 100° C., such as a PCB lamination process with a high temperature of 220° C.). The HT-PIF of FIG. 1 is formed by applying heat-tolerant microcapsules (with an encapsulated heat-tolerant pH indicator solution) to a first heat-tolerant polymeric thin film, applying a developer material to a second heat-tolerant polymeric thin film, and joining the two heat-tolerant polymeric thin films (e.g., using an adhesive).

Figure 2:
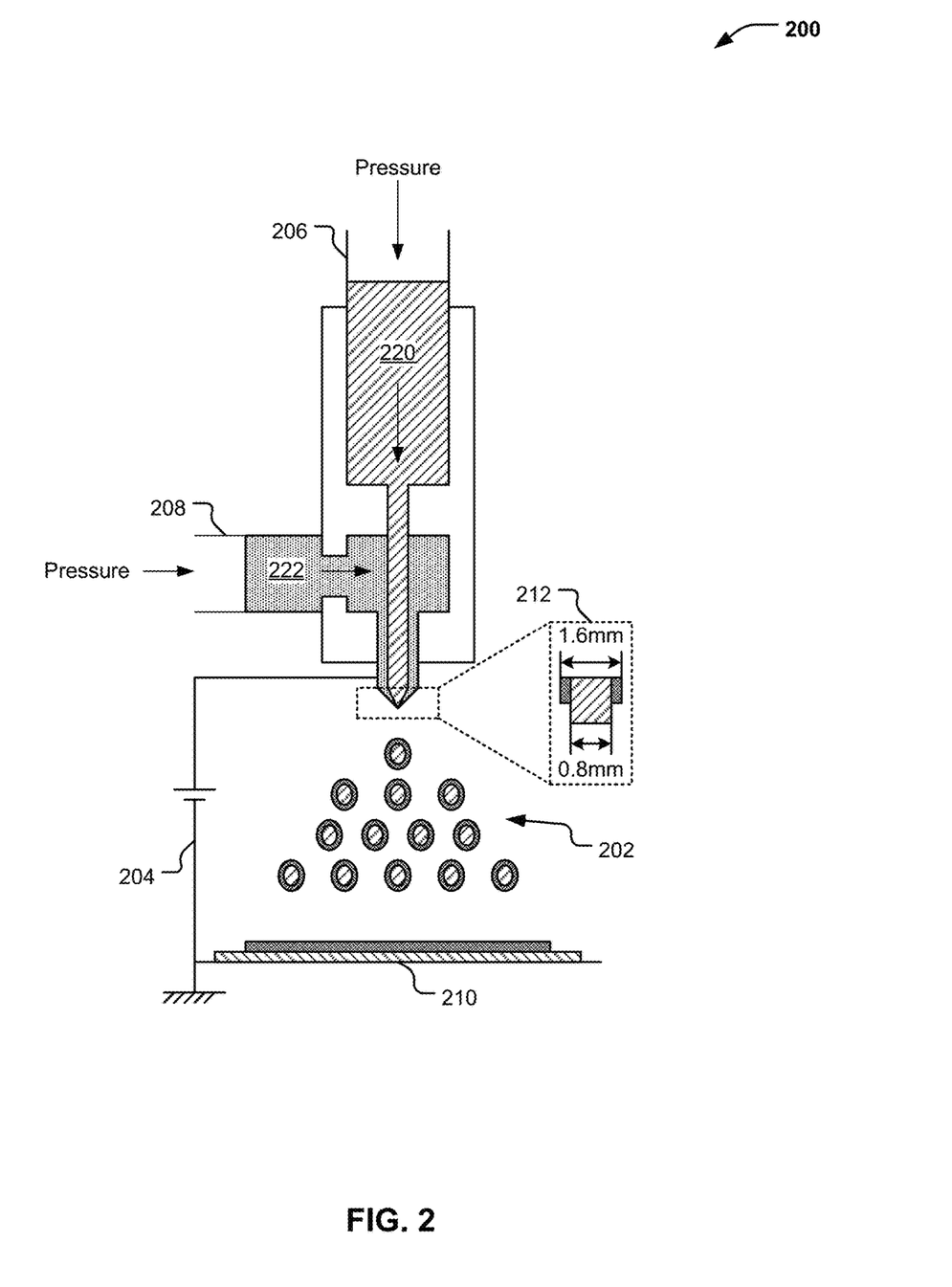
FIG. 2 is a diagram illustrating a process of forming microcapsules to be applied to a surface of a polymeric film material of a HT-PIF.

Referring to FIG. 2, a diagram 200 illustrates an example of an electrospraying operation that may be used to form microcapsules, according to a particular embodiment. In some cases, the microcapsules formed according to the exemplary process described herein with respect to FIG. 2 may correspond to the microcapsules 110 of FIG. 1.

FIG. 2 illustrates a schematic of coaxial electrospraying equipment that includes a high voltage electrostatic spinning machine (e.g., from Beijing Fuyouma Technology Co., Ltd.) for fabrication of microcapsules 202. The high voltage electrostatic spinning machine includes a high voltage electrostatic force (designated 204), two syringe pumps (shown applying pressure to a first syringe 206 and a second syringe 208, respectively), and a plate collector (designated 210) covered with aluminum foil. A coaxial nozzle 212 is located above the plate collector 210. For illustrative purposes only, the coaxial nozzle 212 of FIG. 2 is shown having an inner diameter of 0.8 mm and an outer diameter of 1.6 mm. Microencapsulation allows for changes in shell thickness and particle size. These variations are desired for changing the pressures at which the capsules break. For example, failure (breaking) of the microcapsules may be diameter dependent, with smaller capsules failing at lower loads.

FIG. 2 illustrates that pressure is applied to an encapsulant solution 220 that includes a payload in the first syringe 206, and pressure is applied to an encapsulating shell material solution 222 in the second syringe 208. In a particular embodiment, the encapsulating shell material solution 222 includes a polyamic acid (PAA) solution, and the encapsulant solution 220 may include a pH indicator and a high boiling point solvent. As an illustrative non-limiting example, the pH indicator may include phenolphthalein, and the high boiling point solvent may include propylene carbonate.

As described further herein, the equipment illustrated in FIG. 2 may be used to perform an electrospraying operation to form microcapsules 202 having a PAA shell material encapsulating a payload that includes a pH indicator and a solvent. The microcapsules 202 may be collected from the plate collector 210 and heated to imidize the PAA to form thermally stable polyimide microcapsules. In a particular embodiment, the thermally stable polyimide microcapsules may correspond to the microcapsules 110 of FIG. 1. As described further herein with respect to FIG. 1, the thermally stable polyimide microcapsules may be applied to a surface of one polymeric film material (e.g., a first polyimide film), a developer material (e.g., an acidic or basic material) may be applied to a surface of another polymeric film material (e.g., a second polyimide film), and the two films may be joined (e.g., using an adhesive) to form a HT-PIF suitable for use in high temperature applications.

Example: Formation of Polyamic Acid (PAA)

An example process of forming polyamic acid (PAA) may include adding 5 mmol 4,4-ODA (1.002 g), 5 mmol 2,6-DAAQ (1.912 g) and DMAc (33.749 g) into a 100 mL three-necked glass flask under flowing nitrogen. The glass flask equipped with a magnetic stirrer may be immersed in an ice-water bath. Then, 10 mmol PMDA (2.182 g) may be added after the two diamines have completely dissolved. The reaction mixture may be stirred for 6 hours in the ice-water bath. The resulting viscous PAA solution may be kept in a freezer for subsequent use.

Example: Formation of PAA Microcapsules

Using a high voltage electrostatic spinning machine, PAA and encapsulate (e.g., a high boiling point solvent and a high boiling point indicator, such as phenolphthalein) may be placed in two separate syringes. An 18 weight percent PAA solution (DMAc as solvent) may be extruded through the outer nozzle at a constant rate of 1.250 mL/h, while the rate of phenolphthalein in propylene carbonate (1 percent w/v) through the inner nozzle may be 0.375 mL/h under atmosphere at a temperature of about 50° C. The feed rate ratio of shell to core is set to 10:3. Variations in feed rates of shell material and encapsulant may be done to change microcapsule mean size.

Example: Formation of Polyimide Microcapsules

After formation of microcapsules via electrospraying method, the capsules may be placed in an oven at 170° C. to imidize the PAA and thus form thermally stable polyimide microcapsules.

Thus, FIG. 2 illustrates an example of an electrospraying operation that may be used to form heat-tolerant microcapsules. The heat-tolerant microcapsules may be utilized as a component of a HT-PIF, as described further herein. Although FIG. 2 depicts one illustrative example of a process of forming heat-tolerant microcapsules, it will be appreciated that alternative equipment, materials, and/or methods may be utilized.

Figure 3:
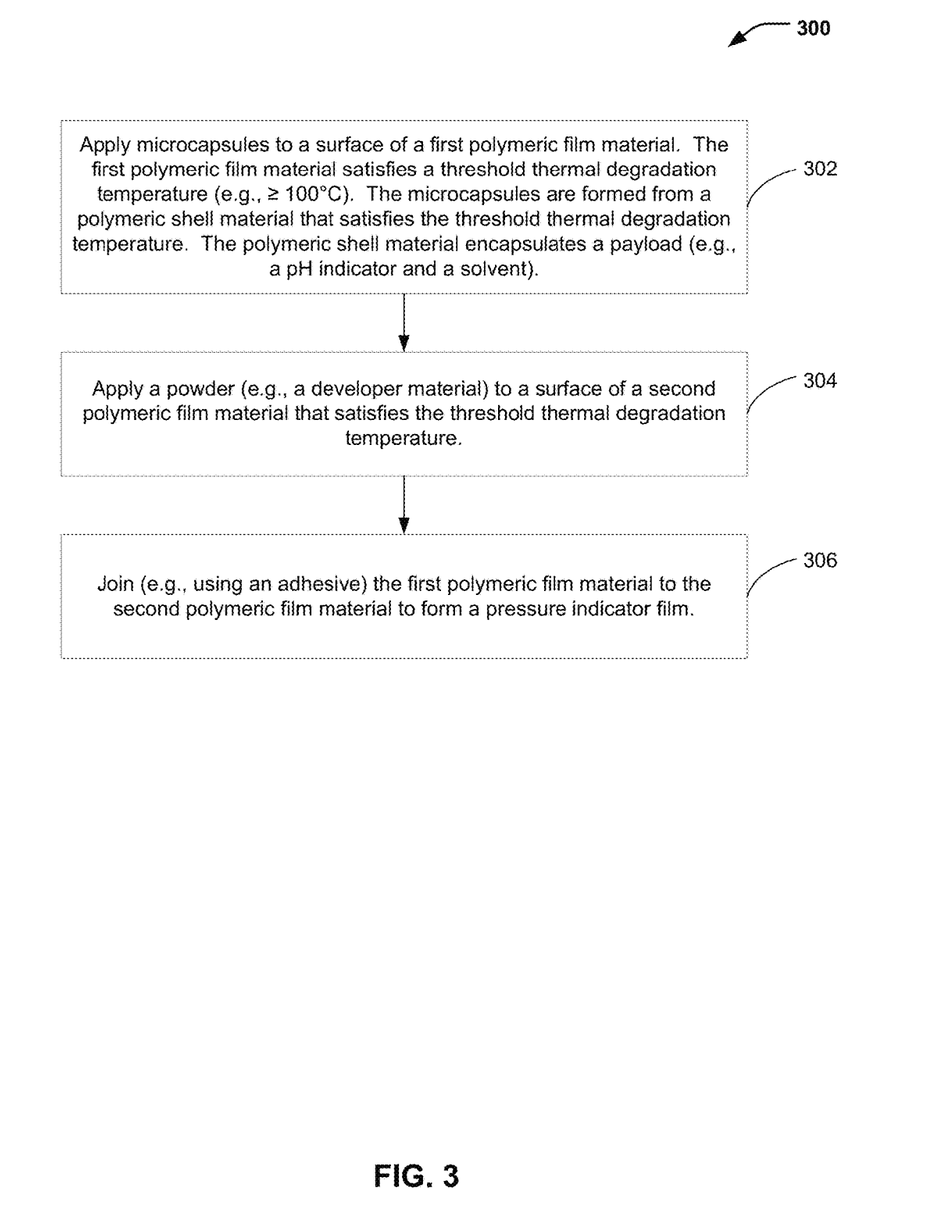
FIG. 3 is a flow diagram showing a particular embodiment of a process of forming a HT-PIF.

Referring to FIG. 3, a flow diagram illustrates a process 300 of forming a high temperature pressure indicator film (HT-PIF), according to one embodiment. In the particular embodiment illustrated in FIG. 3, an encapsulated payload includes a pH indicator and a high boiling point solvent. As described further herein, in other cases, the encapsulated payload may include a developer material, and the pH indicator may be applied to an opposite surface of a heat-tolerant polymeric film material.

The process 300 includes applying microcapsules to a surface of a first polymeric film material, at 302. The first polymeric film material satisfies a threshold thermal degradation temperature that is not less than 100° C., and the microcapsules are formed from a polymeric shell material that satisfies the threshold thermal degradation temperature. For example, referring to FIG. 1, the microcapsules 110 may be applied to the surface of the first polymeric film material 104. To illustrate, the first polymeric film material 104 may be a polyimide film having a thermal degradation temperature of about 400° C. Further, as depicted in the callout view 120 of FIG. 1, the microcapsules 110 may be formed from a thermally stable polymeric shell material 122, such as a polyimide material. In some cases, the microcapsules 110 of FIG. 1 may be formed according to the process illustrated and further described herein with respect to FIG. 2. FIG. 1 further illustrates that the polymeric shell material 122 encapsulates a payload (e.g., a pH indicator and a high boiling point solvent).

The process 300 includes applying a powder to a surface of a second polymeric film material, at 304. The second polymeric film material satisfies the threshold thermal degradation temperature. For example, referring to FIG. 1, the developer material 112 may be applied to the surface of the second polymeric film material 106. The developer material 112 may be suitable for use with the pH indicator in the payload 124 of the microcapsules 110. As an illustrative, non-limiting example, the pH indicator may be phenolphthalein, and the developer material 112 may include a basic material (such as lime) to trigger a color change from colorless to fuchsia within a pH range of 8.3 to 10.0.

The process 300 includes joining the first polymeric film material and the second polymeric film material to form a high-temperature pressure indicator film (HT-PIF), at 306. For example, referring to FIG. 1, the first polymeric film material 104 (having the microcapsules 110 applied to a surface) and the second polymeric film material 106 (having the developer material 112 applied to a surface) may be joined to form the HT-PIF 102.

Thus, FIG. 3 illustrates an example of a process of forming a pressure indicator film for use in high temperature applications (referred to herein as a HT-PIF). The HT-PIF formed according to the process described with respect to FIG. 3 may be suitable for use in a variety of applications that require the application of high heat, such as PCB laminate manufacturing (among other alternatives).

Figure 4:
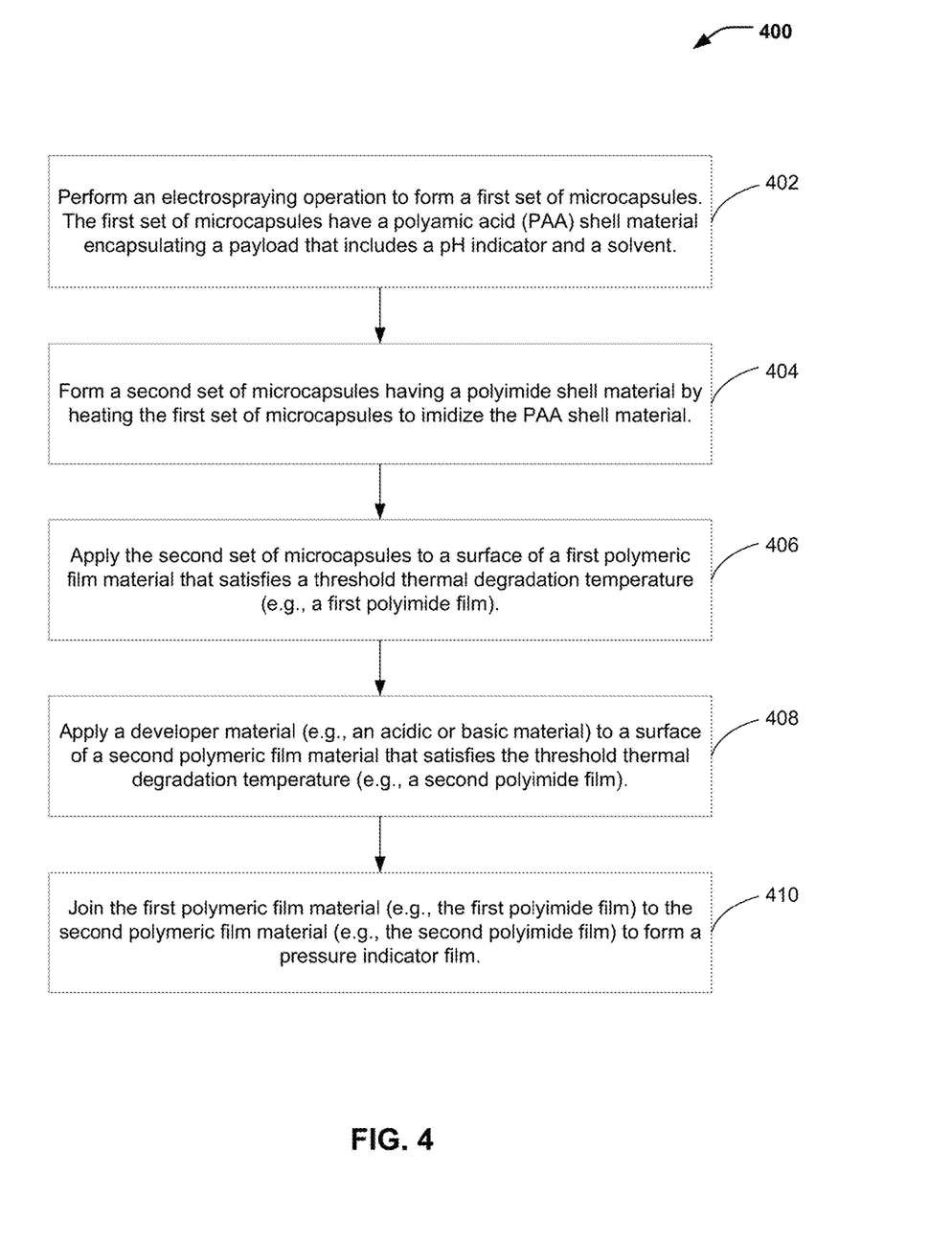
FIG. 4 is a flow diagram showing a particular embodiment of a process of forming a HT-PIF.

Referring to FIG. 4, a flow diagram illustrates an example of a process 400 of forming a high temperature pressure indicator film (HT-PIF), according to a particular embodiment. In the example of FIG. 4, an electrospraying operation may be used to form a first set of microcapsules, and the first set of microcapsules may be heated to form a second set of microcapsules that are heat-tolerant. In the particular embodiment illustrated in FIG. 4, an encapsulated payload includes a pH indicator and a high boiling point solvent. As described further herein, in other cases, the encapsulated payload may include a developer material, and the pH indicator may be applied to an opposite surface of a heat-tolerant polymeric film material.

The process 400 includes performing an electrospraying operation to form a first set of microcapsules, at 402. The first set of microcapsules have a PAA shell material encapsulating a payload that includes a pH indicator and a solvent. For example, the electrospraying operation illustrated and described further herein with respect to FIG. 2 may be used to form the (PAA encapsulated) microcapsules 202.

The process 400 includes forming a second set of microcapsules having a polyimide shell material by heating the first set of microcapsules to imidize the PAA shell material, at 404. For example, as further described herein with respect to FIG. 2, the microcapsules 202 may be collected from the plate collector 210, placed in an oven, and heated in the oven at about 170° C. to imidize the PAA and thus form the thermally stable polyimide microcapsules. The thermally stable polyimide microcapsules may correspond to the microcapsules 110 illustrated and further described herein with respect to FIG. 1.

The process 400 includes applying the second set of microcapsules to a surface of a first polymeric film material that satisfies a threshold thermal degradation temperature, at 406. For example, referring to FIG. 1, the microcapsules 110 may be applied to the surface of the first polymeric film material 104. As an example, the first polymeric film material 104 may include a polyimide film having a thermal degradation temperature of about 400° C.

The process 400 includes applying a developer material to a surface of a second polymeric film material that satisfies the threshold degradation temperature, at 408. For example, referring to FIG. 1, the developer material 112 may be applied to the surface of the second polymeric film material 106. As an example, the second polymeric film material 106 may include a polyimide film having a thermal degradation temperature of about 400° C.

The process 400 includes joining the first polymeric film material to the second polymeric film material to form a pressure indicator film, at 410. For example, referring to FIG. 1, after application of the microcapsules 110 and the developer material 112, the first polymeric film material 104 may be joined to the second polymeric film material 106 to form the HT-PIF 102. In a particular embodiment, the pressure indicator film formed according to the process 400 of FIG. 4 has a total thickness value (depicted as $T_3$ in FIG. 1) that satisfies a threshold thickness value associated with satisfactory pressure distribution measurement of a PCB lamination operation (among other high temperature applications).

Thus, FIG. 4 illustrates an example of a process of forming a HT-PIF that includes microcapsules having polyimide shell materials. In some cases, the heat-tolerant polyimide microcapsules may be formed according to the process described herein with respect to FIG. 2, and the heat-tolerant polyimide microcapsules may be applied to a polymeric film material with a satisfactory thermal degradation temperature (e.g., a polyimide film with a thermal degradation temperature of about 400° C.). The HT-PIF may be suitable for use in high temperature applications, including PCB laminate manufacturing (among other alternatives).

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A pressure indicator film comprising:
a first polymeric film material that satisfies a threshold thermal degradation temperature that corresponds to a temperature associated with a printed circuit board (PCB) lamination operation;
a second polymeric film material that satisfies the threshold thermal degradation temperature;
microcapsules on a surface of the first polymeric film material; and
a developer material on a surface of the second polymeric film,
wherein the microcapsules are formed from a polymeric shell material that satisfies the threshold thermal degradation temperature, the polymeric shell material including a polyimide material, and
wherein the microcapsules encapsulate a payload that includes a pH indicator and a solvent having a boiling point that is greater than the threshold thermal degradation temperature.

2. The pressure indicator film of claim 1, wherein the first polymeric film material includes a first polyimide material, and wherein the second polymeric film material includes a second polyimide material.

3. The pressure indicator film of claim 1, wherein the pressure indicator film has a total thickness value that is less than 6 mm, the total thickness value including a first thickness value of the first polymeric film material and a second thickness value of the second polymeric film material.

4. The pressure indicator film of claim 3, wherein the total thickness value is in a range of 2 mm to 5.8 mm.

5. The pressure indicator film of claim 3, wherein the first thickness value is about 1 mm, and wherein the second thickness value is about 1 mm.

6. The pressure indicator film of claim 1, wherein the pressure indicator film has a total thickness value that satisfies a threshold thickness value associated with satisfactory pressure distribution measurement of a printed circuit board (PCB) lamination operation.

7. The pressure indicator film of claim 1, wherein the pH indicator includes phenolphthalein.

8. The pressure indicator film of claim 1, wherein the developer material includes a basic material or an acidic material.

9. The pressure indicator film of claim 1, wherein the solvent includes propylene carbonate, ethylene carbonate, 1,3-Dimethyl-2-imidazolidinone (DMI), 1,3-Dimethyl-3,4,5,6-tetrahydro-2-pyrimidone (DMPU), sulfolane, or ethylene glycol.

10. The pressure indicator film of claim 1, wherein at least one of the first polymeric film material or the second polymeric film material is substantially optically transparent.

11. The pressure indicator film of claim 1, further comprising an adhesive to join the first polymeric film material to the second polymeric film material.

12. The pressure indicator film of claim 1, wherein the thermal degradation temperature is 220° C. or greater.

13. A process of forming a pressure indicator film, the process comprising:
applying microcapsules to a surface of a first polymeric film material, wherein the first polymeric film material satisfies a threshold thermal degradation temperature that is not less than 100° C., wherein the microcapsules are formed from a polymeric shell material that satisfies the threshold thermal degradation temperature and wherein the microcapsules encapsulate a payload that includes a developer material and a solvent having a boiling point that is greater than the threshold thermal degradation temperature;
applying a powder to a surface of a second polymeric film material, wherein the second polymeric film material satisfies the threshold thermal degradation temperature and wherein the powder includes a pH indicator material; and
joining the first polymeric film material to the second polymeric film material to form a pressure indicator film.

14. The process of claim 13, wherein the first polymeric film material and the second polymeric film material are joined using an adhesive.

15. The process of claim 13, wherein the thermal degradation temperature is 220° C. or greater.

16. A process of forming a pressure indicator film, the process comprising:
performing an electrospraying operation to form a first set of microcapsules, the first set of microcapsules having a polyamic acid (PAA) shell material encapsulating a payload that includes a pH indicator and a solvent;
forming a second set of microcapsules having a polyimide shell material by heating the first set of microcapsules to imidize the PAA shell material;
applying the second set of microcapsules to a surface of a first polyimide film;
applying a developer material to a surface of a second polyimide film; and
joining the first polyimide film to the second polyimide film to form a pressure indicator film.

17. The process of claim 16, wherein the pressure indicator film has a total thickness value that satisfies a threshold thickness value associated with satisfactory pressure distribution measurement of a printed circuit board (PCB) lamination operation.

* * * * *